C. R. Ellis. Boilers for Heating Apparatus &c.
No. 73084
Fig. 1
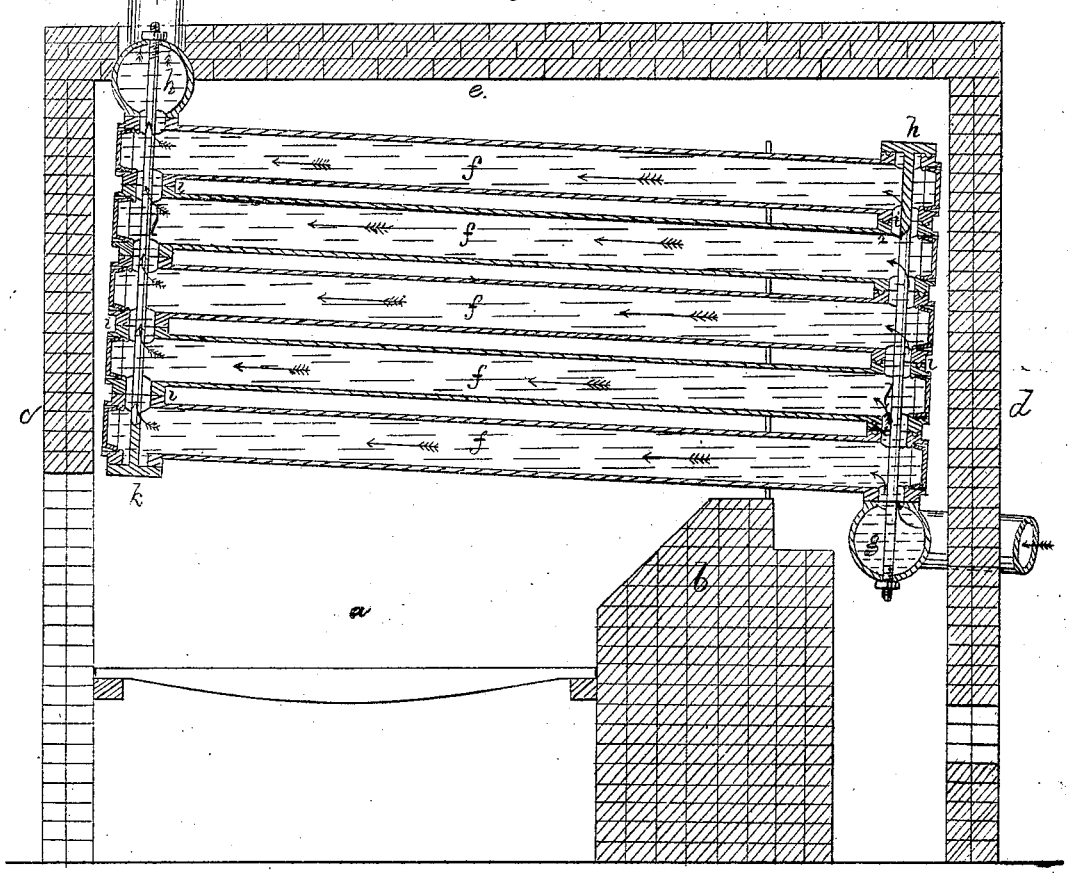
PATENTED
JAN. 7 1868
Chas R Ellis
Witnesses
Geo. D. Walker
Chas H Smith
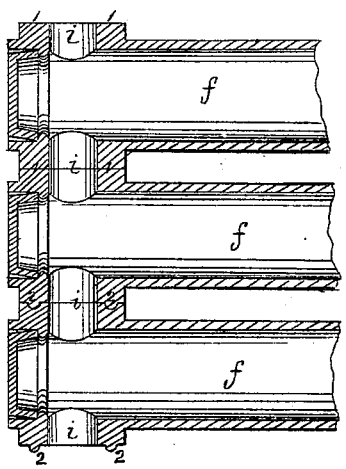
Fig. 3
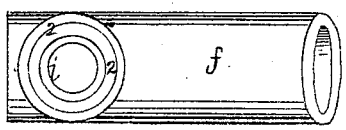
Fig. 2

United States Patent Office.

CHARLES R. ELLIS, OF BROOKLYN, NEW YORK.

Letters Patent No. 73,084, dated January 7, 1868.

BOILERS FOR HEATING-APPARATUS.

*The Schedule referred to in these Letters Patent and making part of the same.*

TO ALL WHOM IT MAY CONCERN:

Be it known that I, CHARLES R. ELLIS, of Brooklyn, in the county of Kings, and State of New York, have invented, made, and applied to use a certain new and useful Improvement in Boilers for Heating-Apparatus, &c.; and I do hereby declare the following to be a full, clear, and exact description of the said invention, reference being had to the annexed drawing, making part of this specification, wherein—

Figure 1 is a vertical section of a boiler fitted with my improvement.

Figure 2 is a plan of the end of one of the pipes in larger size; and

Figure 3 is a vertical section, showing the ends of some of the pipes in larger size than fig. 1.

The same letters denote corresponding parts.

The object of this invention is to furnish a cheap and tight joint for the pipes of a tubular boiler employed in heating-apparatus, &c.

The said invention consists in a water-way thimble formed upon the side of the pipe, near the end thereof, setting against a corresponding water-way thimble in the adjacent pipe, the series of pipes and joints being held together by tie-bolts passing through these water-way thimbles at right angles to the pipes.

In hot-water warming-apparatus it is desirable to have a large extent of surface exposed to the action of the fire, and also to have the same as compact as possible; and cheapness of construction and facility for repairs are also essential features both in the boiler and the radiating coil. These points are all secured by my present invention.

In the drawing, $a$ represents the fire-chamber, $b$ the bridge-wall, $c$ the front, $d$ the back, and $e$ the top of the boiler-space. These parts are shown of brickwork. They may be made in any desired manner, and of proper material. The boiler itself is composed of a coil of pipes, $f$, and I remark that my improved connections for said pipes may be employed in the radiating-coil of the heating-apparatus as well as in the furnace-coil. $g$ is the cross-pipe, through which the return circulation enters from the radiating-pipes into the boiler-pipes, and $h$ is a similar pipe at the upper end of the boiler-coil, through which the heated water ascends to the upper part of said coil, as usual. The tubes $f$ are formed with water-way thimbles $i$ $i$ on opposite sides, near the ends of the pipes, and the flat surfaces of these thimbles come together, as seen at 1 1, or the surfaces may have circular beads and ribs setting into each other, as seen at 2 2. A tie-bolt, $l$, passes through the thimbles at each end of the vertical range of tubes and caps $k$, close the end-thimbles, and receive the heads and nuts of the bolts $l$. Putty or cement is to be introduced between the surfaces of the thimbles that come together, and the screwing up of the bolts $l$ renders the joints perfectly tight, and squeezes out surplus cement. The pipes $g$ and $h$ are to have each a range of the thimbles on one side, to unite with the thimbles of the respective ranges of pipes $f$, and the head or nut of the bolts $l$ may come against the outside of the said pipe $g$ or $h$, the bolt itself passing through a hole on the opposite side to the water-way thimble.

This improved connection for the circulating-pipes gives great facility in fitting the coils of pipes together, and but little workmanship is required.

I do not claim a series of steam-radiating cases connected together by tie-bolts.

What I claim, and desire to secure by Letters Patent, is—

A series of pipes for a hot-water heating-apparatus, formed with the water-way thimbles near the ends of the tubes, in combination with the pipe ($g$ or $h$) having a range of thimbles on one side, the whole being connected together by tie-rods, as set forth.

Dated April 30, A. D. 1867.

CHAS. R. ELLIS.

Witnesses:
   CHAS. H. SMITH,
   GEO. D. WALKER.